ately, Agent, or Firm—D. R. Lackey

United States Patent [19]
Lee

[11] 4,328,590
[45] May 4, 1982

[54] SINGLE SIDEBAND RECEIVER

[75] Inventor: Ronald L. Lee, Reno, Nev.

[73] Assignee: Westinghouse Electric Corp., Pittsburgh, Pa.

[21] Appl. No.: 202,553

[22] Filed: Oct. 31, 1980

[51] Int. Cl.³ .............................................. H04B 1/68
[52] U.S. Cl. .............................. 455/203; 179/1 GS; 455/295; 455/303; 455/308; 455/313
[58] Field of Search .............. 455/203, 207, 232, 295, 455/303, 306, 307, 308, 313, 72; 370/20, 74; 333/14; 179/1 GS, 15.55 R

[56] References Cited

U.S. PATENT DOCUMENTS

| | | | |
|---|---|---|---|
| 3,559,068 | 1/1971 | Almering | 455/72 |
| 3,913,019 | 10/1975 | Booth | 455/208 |
| 3,991,419 | 11/1976 | Thomas | 455/313 |
| 4,042,782 | 8/1977 | Worcester | 455/203 |
| 4,092,596 | 5/1978 | Dickinson | 370/74 |
| 4,100,376 | 7/1978 | Woythaler | 370/20 |
| 4,126,828 | 11/1978 | Kumagai | 455/207 |
| 4,135,159 | 1/1979 | Kubanoff | 455/232 |

*Primary Examiner*—Howard Britton
*Attorney, Agent, or Firm*—D. R. Lackey

[57] ABSTRACT

A single sideband receiver translates the frequencies of a received signal composed of a data signal and a pilot tone to predetermined intermediate frequencies. Filters separate the intermediate frequency data signal and the intermediate frequency pilot tone. The frequency of the intermediate frequency pilot tone is translated to a frequency sufficiently removed from the frequency spectrum of the intermediate frequency data signal so as not to interfere therewith. The translated, intermediate frequency, pilot tone and the intermediate frequency data signal are amplified by a single automatic gain controlled amplifier. A demodulator produces audio output signals and a recovered pilot tune in response to the output signal of the amplifier. The recovered pilot tone is input to a pilot regenerator. The output signal of the pilot regenerator is input to the demodulator. The recovered pilot tone is also input to an automatic gain control circuit. The automatic gain control circuit together with a gain limiter control the gain of the amplifier.

19 Claims, 3 Drawing Figures

SINGLE SIDEBAND RECEIVER

BACKGROUND OF THE INVENTION

1. Field of the Invention

This invention is related generally to single sideband receivers and specifically to single sideband receivers used in systems wherein the channels are tightly packed within an allocated frequency range.

2. Description of the Prior Art

There exists a large variety of techniques for the reception, amplification, and demodulation of communication signals. Single sideband modulation, or SSB, is a type of amplitude modulation, AM, wherein one of the sidebands and virtually all of the carrier are eliminated. Single sideband receivers capable of receiving, amplifying and demodulating a single sideband modulated signal are well known and understood in the prior art. The present invention is for a single sideband receiver intended for use in a communications system having tightly packed channels.

One example of a communications system wherein the channels are tightly packed within an allocated frequency range is a power line communications system. A typical signal for a power line communications system is composed of a data signal occupying a discrete frequency spectrum and a pilot tone. Due to bandwidth limitations the frequency of the pilot tone is adjacent to the frequency spectrum of the data signal. The pilot tone acts as a reference signal carrying phase and amplitude information about the data signal. The pilot tone is therefore instrumental in controlling both the amplification and the demodulation of the received signal.

One prior art technique for receiving and demodulating a single sideband signal provides for filtering a received signal followed by translating the signal to an intermediate frequency signal. The intermediate frequency signal is filtered and amplified. The amplified signal is again filtered to separate the pilot tone from the data signal. The pilot tone is used for automatically controlling the gain of the amplifier and as the input signal to a pilot regenerator. The output of the pilot regenerator is used to demodulate the data signal thus producing an audio output signal.

The major objection to this prior art receiver is the large burden this technique places on the filter located before the amplifier. This filter must distinguish the data signal and pilot tone of one channel from the data signal and pilot tones of immediately adjacent channels. This necessitates the use of an expensive filter having the requisite steep skirts.

A second prior art technique provides for filtering the received signal followed by frequency translation of the filtered signal to an intermediate frequency signal. The intermediate frequency signal is filtered to separate the pilot tone from the data signal. The pilot tone and data signal are then amplified in identical, parallel tracking amplifiers. As in the first prior art technique, the amplified pilot tone is used for automatically controlling the gain of both amplifiers and as the input to a pilot regenerator. The output of the pilot regenerator is used to demodulate the data signal thus producing an audio output signal.

This second prior art technique eliminates the large burden on the filter found in the first prior art technique discussed. By separating the pilot tone from the data signal with filters having a bandwidth less than the total bandwidth, out of channel rejection before amplification is greater. Thus, less expensive filters may be utilized. Although the large burden on the filter found in the first prior art technique has been eliminated a new problem area has been introduced. In the second prior art technique, identical, parallel tracking amplifiers are required so that amplification of the pilot tone, which is the reference signal, will be the same as the amplification of the data signal. Identical, parallel tracking amplifiers with low cross coupling are expensive and difficult to maintain.

The present invention through its use of parallel, intermediate frequency, signal paths and a single gain controlled amplifier eliminates the need for both expensive filters and parallel tracking amplifiers as is required by the prior art techniques discussed above. These, and other advantages, are discussed in detail hereinbelow in the description of the preferred embodiment.

SUMMARY OF THE INVENTION

A single sideband receiver for a communications system having tightly packed channels is disclosed. The received signal is typically composed of a data signal occupying a discrete frequency spectrum and a pilot tone having a frequency immediately adjacent to the frequency spectrum of the data signal. After reception, the frequencies of the data signal and the pilot tone are translated to predetermined intermediate frequencies. Filters separate the intermediate frequency data signal and the intermediate frequency pilot tone. The frequency of the intermediate frequency pilot tone is translated to a frequency sufficiently removed from the frequency spectrum of the intermediate frequency data signal so as not to interfere therewith. The translated, intermediate frequency, pilot tone and the intermediate frequency data signal are both amplified by the same amplifier. A demodulator produces audio output signals and a recovered pilot tone in response to the output of the amplifier. The recovered pilot tone is used for automatically controlling the gain of the amplifier and as the input signal to a pilot regenerator loop. The output signal of the pilot regenerator loop is input to the demodulator.

DESCRIPTION OF THE PREFERRED EMBODIMENT

Figure 1:
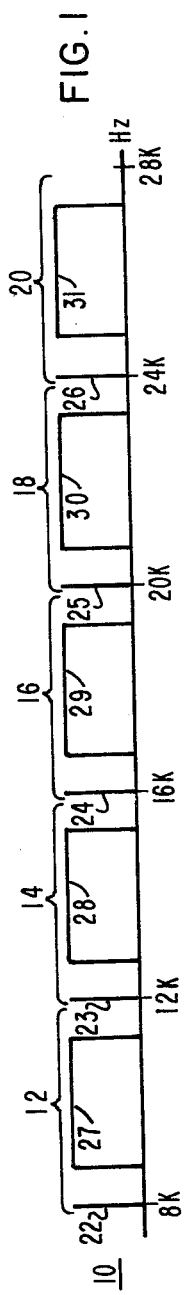
FIG. 1 illustrates the frequency allocations of five discrete channels within a frequency spectrum.

The single sideband receiver disclosed herein is intended for use in a communications system having tightly packed channels such as a power line carrier communications system. Turning to FIG. 1, a typical frequency spectrum 10 illustrating the frequency allocations of five tightly packed channels 12, 14, 16, 18 and 20 is illustrated. For purposes of illustration only, the five channels 12, 14, 16, 18 and 20 are located between eight KHz and twenty-eight KHz, each channel having a four KHz bandwidth. Each channel 12, 14, 16, 18 and 20 is composed of a pilot tone 22 through 26 and a data signal 27 through 31, respectively. The frequency of each of the pilot tones 22 through 26 is the lowest available frequency allocated to its respective channel. For example, the pilot tone 22 of the first channel 12 has a frequency of eight KHz. Each of the data signals 27 through 31 lies between three hundred and thirty-four hundred Hz within its allocated four KHz bandwidth. For example, the data signal 27 of channel 12 lies between 8.3 KHz and 11.4 KHz. An understanding of the frequency spectrum 10 and the frequency allocations of the five channels 12, 14, 16, 18 and 20 is necessary in order to understand the problems encountered by, and the operation of, the single sideband receiver disclosed herein.

Figure 2:
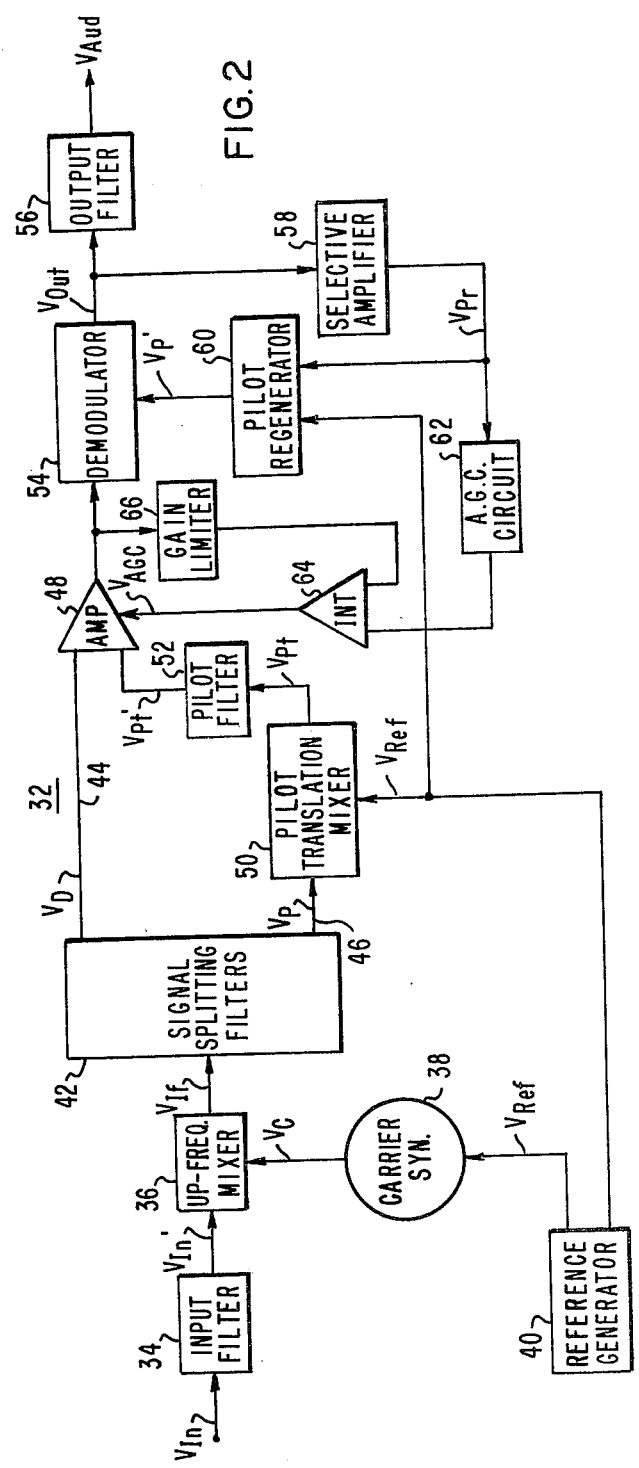
FIG. 2 is a block diagram of a single sideband receiver constructed according to the teachings of the present invention.

Turning to FIG. 2, a block diagram of a single sideband receiver 32 constructed according to the teachings of the present invention is shown. Table I lists the signals introduced and defined in conjunction with the description of the block diagram of FIG. 2.

TABLE I

| Signal | Description |
|---|---|
| $V_{In}$ | Received Signal |
| $V_{In}'$ | Filtered Received Signal |
| $V_C$ | Carrier Signal |
| $V_{If}$ | Intermediate Frequency Signal ($V_D + V_P$) |
| $V_D$ | Intermediate Frequency Data Signal |
| $V_P$ | Intermediate Frequency Pilot Tone |
| $V_{Pt}$ | Translated, Intermediate Frequency, Pilot Tone |
| $V_{Pt}'$ | Filtered, Translated, Intermediate Frequency, Pilot Tone |
| $V_{Out}$ | Output Signal ($V_{Aud} + V_{Pr}$) |
| $V_{Aud}$ | Audio Output Signal |
| $V_{Pr}$ | Recovered Pilot Tone |
| $V_{P'}$ | Regenerated Pilot Tone |
| $V_{AGC}$ | Automatic Gain Control Signal |

An input filter 34 provides initial filtering of a received signal $V_{In}$. Using the frequency spectrum 10 of FIG. 1 as an example, the input filter 34 will pass the frequencies of the received signal $V_{In}$ which lie between eight KHz and twenty-eight KHz and will reject all other frequencies. An up frequency mixer 36 is responsive to the filtered received signal $V_{In}'$. The up frequency mixer 36 mixes the filtered received signal $V_{In}'$ with a carrier signal $V_C$, produced by a carrier synthesizer 38, and produces an intermediate frequency signal $V_{If}$. The intermediate frequency signal $V_{If}$ is composed of an intermediate frequency data signal $V_D$ and an intermediate frequency pilot tone $V_P$. The carrier synthesizer 38 produces the carrier signal $V_C$ in response to both a reference signal $V_{Ref}$ and a manual setting by the user. The reference signal $V_{Ref}$ is produced by a reference generator 40 which is typically comprised of a master oscillator (not shown) and a countdown circuit (not shown).

The up frequency mixer 36 translates both the frequencies of one of the data signals 27 through 31 and the frequency of one of the pilot tones 22 through 26 to predetermined intermediate frequencies. The determination of which data signal and which pilot tone are translated depends upon the frequency of the carrier signal $V_C$. The frequencies of the intermediate frequency data signal $V_D$ and the intermediate frequency pilot tone $V_P$ are sufficiently high such that received signals $V_{In}$ capable of causing false images are rejected by the input filter 34.

Signal splitting filters 42 separate the intermediate frequency data signal $V_D$ and the intermediate frequency pilot tone $V_P$. A first, intermediate frequency, signal path 44 is provided to input the intermediate frequency path signal $V_D$ to an automatic gain controlled amplifier 48. A second, intermediate frequency, signal path 46, in parallel with the first signal path 44, is provided to input the intermediate frequency pilot tone $V_P$ to the amplifier 48. The second, intermediate frequency, signal path 46 is comprised of the series combination of a pilot tone translation mixer 50 and a pilot tone filter 52. The pilot tone translation mixer 50 receives a reference signal $V_{Ref}$ from the reference generator 40 and translates the frequency of the intermediate frequency pilot tone $V_P$ to a frequency sufficiently removed from the frequency spectrum of the intermediate frequency data signal $V_D$ so as not to interfere therewith. The translated, intermediate frequency, pilot tone $V_{Pt}$ is filtered by the pilot tone filter 52. The filtered, translated, intermediate frequency, pilot tone $V_{Pt}'$ is input to the amplifier 48. The multiple, parallel, intermediate frequency, signal paths 44 and 46 are considered to be important features of the present invention.

The amplifier 48 amplifies the intermediate frequency data signal $V_D$ and the filtered, translated, intermediate frequency, pilot tone $V_{Pt}'$. The amplified signals are input to a demodulator 54 which produces an output signal $V_{Out}$ composed of an audio output signal $V_{Aud}$ and a recovered pilot tone $V_{Pr}$. An output filter 56 passes the audio output signal portion $V_{Aud}$ of the output signal $V_{Out}$ which conveys the data to the user. A selective amplifier 58 acts as a filter and passes the recovered pilot tone portion $V_{Pr}$ of the output signal $V_{Out}$. The selective amplifier 58 also acts as a buffer.

The recovered pilot tone $V_{Pr}$ is input to a pilot regenerator 60. The pilot regenerator uses both the recovered pilot tone $V_{Pr}$ and the reference signal $V_{Ref}$ to produce a regenerated pilot tone $V_{P'}$ which is input to the demodulator 54. The recovered pilot tone $V_{Pr}$ is also input to an automatic gain control circuit 62. The output signal of the automatic gain control circuit 62 is integrated by an integrator 64 to produce an automatic gain control signal $V_{AGC}$. The automatic gain control signal $V_{AGC}$ is input to the amplifier 48 and controls the gain thereof. Finally, the output signal of the amplifier 48 is input to a gain limiter 66. The integrator 64 is also responsive to the gain limiter 66 such that in the event that the gain of the amplifier 48 becomes excessive the magnitude of the automatic gain control signal $V_{AGC}$ is modified by the gain limiter 66 so as to reduce the gain of the amplifier 48. The gain limiter 66 is considered to be an important feature of the present invention.

Figure 3:
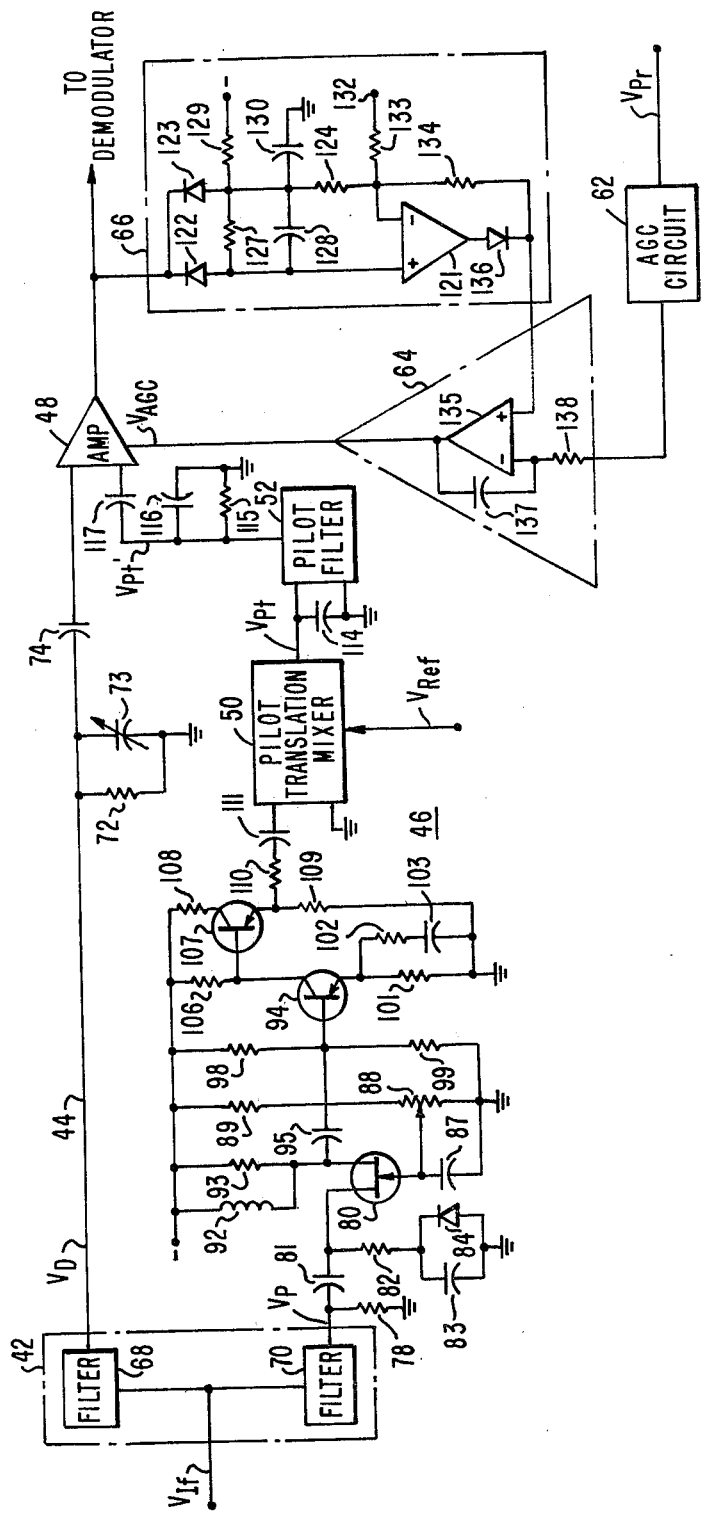
FIG. 3 is an electrical schematic illustrating in detail both the parallel, intermediate frequency, signal paths and the gain limiter circuitry.

Turning to FIG. 3, an electrical schematic illustrating the circuit details of the multiple, parallel, intermediate frequency, signal paths 44 and 46 and the circuitry of the gain limiter 66 is shown. The intermediate frequency signal $V_{If}$ is input to the signal splitting filters 42. The signal splitting filters 42 are comprised of an intermediate frequency, data signal filter 68 and an intermediate frequency, pilot tone filter 70. The filter 68 passes the intermediate frequency data signal $V_D$ which is input to the amplifier 48 by the first, intermediate frequency, signal path 44. An output terminal of the filter 68 is connected to ground through the parallel combination of a resistor 72 and an adjustable capacitor 73. The output terminal of the filter 68 is capacitor coupled through a capacitor 74 to an input terminal of the amplifier 48. The resistor 72 and the capacitors 73 and 74 comprise the first, intermediate frequency, signal path 44.

The filter 70 passes the intermediate frequency pilot tone $V_P$ which is input to the amplifier 48 through the second, intermediate frequency, signal path 46. An output terminal of the filter 70 is connected to ground through a resistor 78 and is connected to a source terminal of a field effect transistor 80 through a capacitor 81. The source terminal of the field effect transistor 80 is connected to ground by a resistor 82 connected in series with the parallel combination of a capacitor 83 and a diode 84. A gate terminal of the field effect transistor 80 is connected to ground through a capacitor 87 and is connected to a wiper of an adjustable resistor 88. The adjustable resistor 88 is series connected with a resistor 89 between a negative voltage source and ground. A drain terminal of the field effect transistor 80 is connected to the negative voltage source through the parallel combination of an inductor 92 and a resistor 93, and is connected to a base terminal of a transistor 94 through a capacitor 95. The base terminal of the transistor 94 is connected to the negative voltage source through a resistor 98 and is connected to ground through a resistor 99. An emitter terminal of the transistor 94 is connected to ground through a resistor 101 in parallel with the series combination of a resistor 102 and a capacitor 103. A collector terminal of the transistor 94 is connected to the negative voltage source through a resistor 106 and is connected to a base terminal of a transistor 107. A collector terminal of the transistor 107 is connected to the negative voltage source through a resistor 108. An emitter terminal of the transistor 107 is connected to ground through a resistor 109. The transistors 80, 94 and 107, together with the associated components, provide two functions. The first function is to match the output impedance of the intermediate frequency, pilot tone filter 70 to the input impedance of the pilot tone translation mixer 50. The second function is to amplify the intermediate frequency pilot tone $V_P$ to compensate for losses in the pilot tone translation mixer 50 and the translated, pilot tone filter 52. It is important for the magnitude of the intermediate frequency pilot tone $V_P$ to remain constant with respect to the magnitude of the intermediate frequency data signal $V_D$.

Continuing with the description of the second, intermediate frequency, signal path 46, the emitter terminal of the transistor 107 is connected to an input terminal of the pilot tone translation mixer 50 through the series combination of a resistor 110 and a capacitor 111. An output terminal of the pilot tone translation mixer 50 is connected to ground through a capacitor 114 and is connected to an input terminal of the translated, pilot tone filter 52. An output terminal of the translated, pilot tone filter 52 is connected to ground through the parallel combination of a resistor 115 and a capacitor 116, and is connected to the amplifier 48 through a capacitor 117. The impedance matching circuitry provided by the transistors 80, 94 and 107 together with the pilot tone translation mixer 50 and the translated, pilot tone filter 52 make up the second, intermediate frequency, signal path 46.

The advantages of the present invention may best be understood by assigning exemplary frequencies to the various signals. Assume that the intermediate frequency signal $V_{If}$ is composed of an intermediate frequency data signal $V_D$ having a frequency range of from 5.2003 to 5.2034 megahertz and an intermediate frequency pilot tone $V_P$ having a frequency of 5.2 megahertz. At these high intermediate frequencies received signals $V_{In}$ capable of causing false images are easily rejected by the input filter 34. The intermediate frequency, data signal filter 68 and the intermediate frequency, pilot tone filter 70 each has a frequency bandwidth less than the total channel bandwidth. Therefore, out of channel rejection before amplification is greater than for a single narrow filter having a bandwidth spanning the bandwidth of the entire channel. The pilot tone translation mixer 50 of the second, intermediate frequency, signal path 46 translates the frequency of the intermediate frequency pilot tone $V_P$ from 5.2 megahertz to 4.575 megahertz. The frequency of the translated, intermediate frequency, pilot tone $V_{Pt}$ is sufficiently removed from the frequency spectrum of the intermediate frequency data signal $V_D$ so as not to interfere therewith. Because the translated, intermediate frequency, pilot tone $V_{Pt}$ will not interfere with the intermediate frequency data signal $V_D$ both signals may be amplified through a single amplifier. This is considered to be an important advantage of the present invention.

Finishing the description of the FIG. 3, an output terminal of the amplifier 48 is connected to the demodulator 54 (not shown in FIG. 3) and is connected to a non-inverting input terminal of an operational amplifier 121 through a diode 122. The output terminal of the amplifier 48 is also connected to an inverting input terminal of the operational amplifier 121 through the series combination of a diode 123 and a resistor 124. The junction between the diode 123 and the resistor 124 is connected to the non-inverting input terminal of the operational amplifier 121 through the parallel combination of a resistor 127 and a capacitor 128. The junction between the diode 123 and the resistor 124 is also connected to a negative voltage source through a resistor 129 and is connected to ground through a capacitor 130. The inverting input terminal of the operational amplifier 121 is connected through a resistor 133 to a negative six volt reference voltage input at a terminal 132 and is connected to a non-inverting input terminal of an operational amplifier 135 through a resistor 134. An output terminal of the operational amplifier 121 is connected to the non-inverting input terminal of the operational amplifier 135 through a diode 136. An inverting input terminal of the operational amplifier 135 is connected to the automatic gain control circuit 62 through a resistor 138. An output terminal of the operational amplifier 135 is connected to the inverting input terminal thereof through a capacitor 137 and is connected to the amplifier 48. The operational amplifier 135 together with the capacitor 137 and the resistor 138 form the integrator 64 shown in FIG. 1. The automatic gain control signal $V_{AGC}$ is available at the output terminal of the operational amplifier 135. The operational amplifier 121 together with the associated components form the gain limiter 66 shown in FIG. 1.

The gain limiter 66 acts as an overload limiter modifying the magnitude of the automatic gain control signal $V_{AGC}$ in response to the magnitude of the amplified, translated, intermediate frequency, pilot tone available at the output terminal of the amplifier 48. The gain limiter 66 is required for the situation wherein the intermediate frequency data signal $V_D$ abruptly increases in amplitude driving the amplifier 48 into saturation before the automatic gain control signal $V_{AGC}$ can correct the gain of the amplifier 48. The saturation characteristics of the amplifier 48 are such that the amplified, intermediate frequency, data signal $V_D$ will swamp the amplified, translated, intermediate frequency, pilot tone $V_{Pt}'$ causing the automatic gain control signal $V_{AGC}$ to handup at its maximum value. The gain limiter 66 is provided to prevent this situation. It automatically turns down the gain of the amplifier 48 if the magnitude of the signal available at the output terminal of the amplifier (the signal being the combination of the amplified, translated, intermediate frequency, pilot tone and the amplified, intermediate frequency data signal) is greater than 150 millivolts, rms. Except in overload conditions the gain limiter 66 has no effect on the magnitude of the automatic gain control signal $V_{AGC}$.

The resistors 133, 124 and 129 act as a voltage divider. The operational amplifier 121 acts as a comparator comparing the voltage across the resistor 124 to the voltage across the resistor 127. Under normal operating conditions the magnitude of the signal available at the output terminal of the operational amplifier 48 is less than 150 millivolts. Under these conditions, the voltage across the resistor 124 is greater than the voltage across the resistor 127 resulting in a positive voltage, with respect to the non-inverting input terminal of the operational amplifier 121, being input to the inverting input terminal of the operational amplifier 121. A voltage available at the output terminal of the operational amplifier 121 is approximately minus twelve volts causing the diode 136 to be non-conductive. Since the diode 136 is non-conductive, the voltage input to the non-inverting input terminal of the operational amplifier 135 is determined by the voltage divider formed by the three resistors 133, 124 and 129. This voltage is approximately minus six and one-half volts, or one-half of a volt more negative than the negative reference voltage input at the terminal 132. If the signal produced by the automatic gain control circuit 62 is more negative than one-half of a volt, with respect to the reference voltage input at the terminal 132, the automatic gain control signal $V_{AGC}$ will become more positive and reduce the gain of the amplifier 48. If the signal produced by the automatic gain control circuit 62 is more positive than one-half of a volt, with respect to the reference voltage input at the terminal 132, the automatic gain control signal $V_{AGC}$ will become more negative thus increasing the gain of the amplifier 48.

Under overload conditions the magnitude of the signal available at the output terminal of the amplifier 48 is greater than 150 millivolts. This causes the voltage across the resistor 124 to be less than the voltage across the resistor 127. Under these conditions the voltage input to the inverting input terminal of the operational amplifier 121 is negative with respect to the non-inverting input terminal of the operational amplifier 121. The voltage available at the output terminal the operational amplifier 121 is minus one volt which causes the diode 136 to become conductive. When the diode 136 is conductive the voltage input to the non-inverting input terminal of the operational amplifier 135 is approximately minus one and six-tenths volts. The automatic gain control signal $V_{AGC}$, available at the output terminal of the operational amplifier 135, becomes more positive causing the gain of the amplifier 48 to decrease. In this manner the gain of the amplifier 48 is turned down by the gain limiter 66 during overload conditions. The gain limiter 66 is considered to be an important feature of the present invention.

Briefly reviewing, a single sideband receiver having multiple, parallel, intermediate frequency, signal paths is disclosed. The intermediate frequency signal path for the intermediate frequency pilot tone has a translation mixer. The translation mixer translates the frequency of the intermediate frequency pilot tone to a frequency sufficiently removed from the frequency spectrum of the intermediate frequency data signal so that the translated, intermediate frequency, pilot tone may be amplified in the same amplifier as the intermediate frequency data signal. Both signals are amplified in an automatic gain controlled amplifier. An overload limiter is provided to turn down the gain of the amplifier in the event of overload conditions.

What we claim is:

1. A single sideband receiver for the reception of signals composed of a data signal occupying a frequency spectrum and a pilot tone having a frequency adjacent to the frequency spectrum of the data signal, comprising:
    means for receiving the data signal and the pilot tone, said means translating the frequency spectrum of said data signal and the frequency of said pilot tone to predetermined intermediate frequencies;
    filter means separating said intermediate frequency data signal and said intermediate frequency pilot tone;
    means for translating the frequency of said intermediate frequency pilot tone to a frequency sufficiently removed from the frequency spectrum of said intermediate frequency data signal so as not to interfere therewith;
    means for amplifying both said translated intermediate frequency pilot tone and said intermediate frequency data signal; and
    demodulation means producing output signals in response to said amplifier means.

2. The single sideband receiver of claim 1, wherein the means for receiving includes an input filter receiving the data signal and the pilot tone, and including a mixer responsive to said filter, said mixer translating the frequency spectrum of said data signal and the frequency of said pilot tone to the predetermined intermediate frequencies.

3. The single sideband receiver of claim 2, wherein the predetermined intermediate frequencies are substantially higher than the frequencies of the data signal and the pilot tone such that received signals capable of causing false images are rejected by the input filter.

4. The single sideband receiver of claim 1, wherein the intermediate frequency data signal has a frequency spectrum of from 5.2003 megahartz to 5.2034 megahertz.

5. The single sideband receiver of claim 1, wherein the intermediate frequency pilot tone has a frequency of 5.2 megahertz.

6. The single sideband receiver of claim 1, wherein the means for translating the intermediate frequency pilot tone includes a mixer, and including a filter responsive to said mixer.

7. The single sideband receiver of claim 1, including an impedance matching circuit located between the filter means separating the intermediate frequency data signal and the intermediate frequency pilot tone and the means for translating, said impedance matching circuit also amplifying said intermediate frequency pilot tone.

8. The single sideband receiver of claim 1, wherein the frequency of the translated intermediate frequency pilot tone is 4.575 megahertz.

9. The single sideband receiver of claim 1, wherein the means for amplifying includes an automatic gain controlled intermediate frequency amplifier.

10. The single sideband receiver of claim 1, wherein the demodulation means includes a quadrature detector producing both a recovered pilot tone and the output signals.

11. The single sideband receiver of claim 10 including means producing a regenerated pilot tone in response to the recovered pilot tone, said regenerated pilot tone input to the demodulation means.

12. The single sideband receiver of claim 10, including means producing an automatic gain control signal in response to the recovered pilot tone, and including limiting means modifying the magnitude of said automatic gain control signal in response to the means for amplifying, said automatic gain control signal controlling the gain of said means for amplifying.

13. The single sideband receiver of claim 12 wherein the limiting means includes a comparator responsive to both a reference voltage and the means for amplifying.

14. A single sideband receiver for the reception of signals composed of a data signal occupying a frequency spectrum and a pilot tone having a frequency adjacent to the frequency spectrum of the data signal, comprising:
   means for receiving the data signal and the pilot tone, said means translating the frequency spectrum of said data signal to an intermediate frequency spectrum of from 5.2003 megahertz to 5.2034 megahertz, said means translating the frequency of said pilot tone to an intermediate frequency of 5.2 megahertz;
   filter means separating said intermediate frequency data signal and said intermediate frequency pilot tone;
   a mixer for translating the frequency of said 5.2 megahertz intermediate frequency pilot tone to a frequency of 4.575 megahertz such that said translated intermediate frequency pilot tone does not interfere with said intermediate frequency data signal;
   an automatic gain controlled intermediate frequency amplifier amplifying both said translated intermediate frequency pilot tone and said intermediate frequency data signal;
   an overload limiter turning down the gain of said amplifier in response to the magnitude of the combination of said amplified translated intermediate frequency pilot tone and said amplified intermediate frequency data signal; and
   a quadrature detector producing audio output signals in response to said amplifier.

15. The single sideband receiver of claim 14, including a filter responsive to the 4.575 megahertz translated intermediate frequency pilot tone.

16. The single sideband receiver of claim 14, wherein the quadrature detector produces a recovered pilot tone, and including means producing an automatic gain control signal in response to the recovered pilot tone, said automatic gain control signal input to the amplifier.

17. The single sideband receiver of claim 16, including means producing a regenerated pilot tone in response to the recovered pilot tone, said regenerated pilot tone input to the detector.

18. The single sideband receiver of claim 16 wherein the means producing the automatic gain control signal includes an automatic gain control circuit responsive to the recovered pilot tone, and includes an integrator, said integrator producing said automatic gain control signal in response to said automatic gain control circuit.

19. The single sideband receiver of claim 18 wherein the overload limiter includes a comparator responsive to both a reference voltage and the magnitude of the combination of the amplified translated intermediate frequency pilot tone and the amplified intermediate frequency data signal, and wherein the integrator is reponsive to both said comparator and the automatic gain control circuit.

* * * * *